(12) United States Patent
Lee et al.

(10) Patent No.: US 9,373,164 B2
(45) Date of Patent: Jun. 21, 2016

(54) METHOD FOR CONTROLLING OPERATION OF REFRIGERATOR BY USING SPEECH RECOGNITION, AND REFRIGERATOR EMPLOYING SAME

(75) Inventors: Kyehwan Lee, Gwangmyeong-Si (KR); Eugene Kim, Seongnam-Si (KR); Joohyun Myung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 14/371,681

(22) PCT Filed: Jan. 13, 2012

(86) PCT No.: PCT/KR2012/000335
§ 371 (c)(1),
(2), (4) Date: Jul. 10, 2014

(87) PCT Pub. No.: WO2013/105682
PCT Pub. Date: Jul. 18, 2013

(65) Prior Publication Data
US 2015/0294451 A1 Oct. 15, 2015

(51) Int. Cl.
*G06K 9/00* (2006.01)
*G06T 7/00* (2006.01)
(Continued)

(52) U.S. Cl.
CPC .............. *G06T 7/0004* (2013.01); *F25D 29/00* (2013.01); *G06K 9/46* (2013.01); *G10L 13/00* (2013.01); *F25D 2400/361* (2013.01); *F25D 2500/06* (2013.01); *F25D 2700/02* (2013.01); *F25D 2700/06* (2013.01); *G06K 2209/17* (2013.01); CPC . *G06T 2207/30128* (2013.01); *G10L 15/00* (2013.01); *G10L 15/265* (2013.01)

(58) Field of Classification Search
USPC ............................... 177/143; 62/3.6; 382/312
See application file for complete search history.

(56) References Cited

U.S. PATENT DOCUMENTS

| 2003/0164754 A1* | 9/2003 | Roseen | F25D 25/00 340/309.16 |
| 2006/0281435 A1* | 12/2006 | Shearer | G06K 19/0707 455/343.1 |

(Continued)

FOREIGN PATENT DOCUMENTS

| JP | 60011963 A | * | 1/1985 |
| JP | 04177076 A | * | 6/1992 |

(Continued)

OTHER PUBLICATIONS

PCT International Application No. PCT/KR2012/000335, Written Opinion of the International Searching Authority dated Sep. 20, 2012, 1 page.

*Primary Examiner* — Gregory F Cunningham
(74) *Attorney, Agent, or Firm* — Lee, Hong, Degerman, Kang & Waimey; Jonathan Kang; Harry Lee

(57) ABSTRACT

A refrigerator according to one embodiment of the present invention includes: a memory for storing information on food stored in a storeroom; a weight detecting unit disposed in the storeroom for detecting the weight of the food in order to determine whether food is received or withdrawn; a controller for creating a request for confirmation information on the received or withdrawn food when the food is determined to have been received or withdrawn; a speech output unit for outputting the request created by the controller as speech; and a speech input unit for receiving the response to the output request as speech, wherein the controller analyzes the response and updates information on the food stored in the storeroom.

9 Claims, 18 Drawing Sheets

(51) Int. Cl.
F25D 29/00 (2006.01)
G06K 9/46 (2006.01)
G10L 13/00 (2006.01)
G10L 15/00 (2013.01)
G10L 15/26 (2006.01)

(56) References Cited

U.S. PATENT DOCUMENTS

2009/0102296 A1* 4/2009 Greene ............... H01Q 1/248
307/149
2009/0174142 A1* 7/2009 Sullivan ............... A63F 3/0423
273/272

2011/0291827 A1* 12/2011 Baldocchi ............ G08B 21/043
340/539.11

FOREIGN PATENT DOCUMENTS

| JP | 06068114 A * | 3/1994 |
| KR | 10-1999-0017803 | 3/1999 |
| KR | 20040017978 A * | 3/2004 |
| KR | 100889119 B1 * | 3/2009 |
| KR | 10-2010-0105266 | 9/2010 |
| KR | 10-2011-0024883 | 3/2011 |

* cited by examiner

FIG. 11C

|   |   |   |    |   |   |   |   |    |   |   |   |
|---|---|---|----|---|---|---|---|----|---|---|---|
| 0 | 0 | 0 | 0  | 0 | 0 | 0 | 0 | 0  | 0 | 0 | 0 |
| 0 | 0 | 0 | -1 | 0 | 0 | 0 | 0 | +1 | 0 | 0 | 0 |
| 0 | 0 | 0 | -1 | 0 | 0 | 0 | 0 | +1 | 0 | 0 | 0 |
| 0 | 0 | 0 | 0  | 0 | 0 | 0 | 0 | 0  | 0 | 0 | 0 |
| 0 | 0 | 0 | 0  | 0 | 0 | 0 | 0 | 0  | 0 | 0 | 0 |
| 0 | 0 | 0 | 0  | 0 | 0 | 0 | 0 | 0  | 0 | 0 | 0 |
| 0 | 0 | 0 | 0  | 0 | 0 | 0 | 0 | 0  | 0 | 0 | 0 |
| 0 | 0 | 0 | 0  | 0 | 0 | 0 | 0 | 0  | 0 | 0 | 0 |

APPLE

APPLE

METHOD FOR CONTROLLING OPERATION OF REFRIGERATOR BY USING SPEECH RECOGNITION, AND REFRIGERATOR EMPLOYING SAME

CROSS-REFERENCE TO RELATED APPLICATIONS

This application is the National Stage filing under 35 U.S.C. 371 of International Application No. PCT/KR2012/000335, filed on Jan. 13, 2012, the contents of which are all hereby incorporated by reference herein in its entirety.

TECHNICAL FIELD

The present invention relates to a refrigerator and a method for controlling an operation thereof, and more particularly, to a refrigerator operated upon recognition of a user speech and a method for controlling an operation of a refrigerator.

BACKGROUND ART

A general refrigerator is equipment that keeps food items in storage at a low temperature. In general, a refrigerator includes a freezing chamber and a refrigerating chamber. The freezing chamber keeps food items in storage at a temperature below zero and the refrigerating chamber keeps food items in storage at a temperature above zero.

However, usually, a user may not know food items kept in a refrigerator, and thus, the user should open a refrigerator door and look for and take out a food item kept in a freezing chamber or a refrigerating chamber. In order to address this problem, a technique of providing an interface of inputting information regarding a food item each time a food item is put in a refrigerator has been introduced.

However, this technique has very low utilization because it is inconvenient for a user to input information regarding a food item to be kept in storage through key buttons or a touch screen. Thus, in order to solve this problem, a technique of providing an interface of inputting information regarding a food item through speech recognition each time a food item is put in a refrigerator has been proposed.

However, with this technique, a user should select a particular menu to enter a speech recognition mode and input names, storage positions, and the like, of all of food items kept in storage as speech, lowering user convenience and accuracy, and thus utilization of the technique is low.

DISCLOSURE

Technical Problem

Therefore, an object of the present invention is to provide a refrigerator capable of sensing an event for putting in or out a food item by sensing a change in a weight within a storage chamber and automatically providing an interface allowing for entering a speech recognition mode when an event occurs, thus naturally guiding a user to input his or her speech, and a method for controlling an operation thereof.

Another object of the present invention is to provide a refrigerator capable of sensing an event for putting in or out a food item by sensing a change in a feature information of a captured image of a storage chamber and automatically providing an interface allowing for entering a speech recognition mode when an event occurs, thus naturally guiding a user to input his or her speech, and a method for controlling an operation thereof.

Technical Solution

According to a first exemplary embodiment of the present invention, there is provided a refrigerator including: a memory configured to store information regarding food items kept in a storage chamber; a weight sensing unit disposed in the storage chamber and configured to sense a weight of a food item to determine whether a food item has been received or taken out; a controller configured to, when it is determined that a food item has been received or taken out, generate a request for identifying information regarding the food item which has been received or taken out; a speech output unit configured to output a request generated by the controller as speech; and a speech input unit configured to receive a response with respect to the output request, as speech, wherein the controller analysis the response and updates the information regarding food items kept in the storage chamber.

According to the first exemplary embodiment of the present invention, there is provided a method for controlling an operation of a refrigerator, including: sensing a weight of a food item to determine whether the food item has been received and taken out; when it is determined that the food item has been received or taken out, generating a request for identifying information regarding the food item which has been received or taken out; outputting the generated request as speech; receiving a response with respect to the output request, as speech; and analyzing the response and updating information regarding a food item kept in a storage chamber.

According to a second exemplary embodiment of the present invention, there is provided a refrigerator including: a memory configured to store information regarding food items kept in a storage chamber; an imaging unit disposed in the storage chamber to obtain a captured image of the storage chamber, configured to extract feature information from the captured image, and determine whether a food item has been received or taken out based on the feature information; a controller configured to, when it is determined that a food item has been received or taken out, identify information regarding the food item which has been received or taken out; a speech output unit configured to output a request generated by the controller as speech; and a speech input unit configured to receive a response with respect to the output request, as speech, wherein the controller analysis the response and updates the information regarding food items kept in the storage chamber.

According to the second exemplary embodiment of the present invention, there is provided a method for controlling an operation of a refrigerator, including: obtaining a captured image of a storage chamber, extracting feature information from the captured image, and determining whether a food item has been received or taken out based on the feature information; when it is determined that a food item has been received or taken out, generating a request for identifying information regarding the food item which has been received or taken out; outputting the generated request as speech; receiving a response with respect to the output request, as speech; and analyzing the response and updating information regarding a food item kept in a storage chamber.

Advantageous Effects

According to embodiments of the present invention, a user interface allowing a user to input information regarding a food item kept in storage as speech without having to activating a speech recognition function of a refrigerator on purpose. Thus, since the user interface is provided by intuition, the user may be naturally guided to input a speech. Thus, since a refrigerator may obtain accurate and rich information regarding food items, utilization of the refrigerator may be increased.

BEST MODES

Hereinafter, characteristics and exemplary embodiments of the present disclosure will be described in detail with reference to the accompanying drawings.

Figure 1:
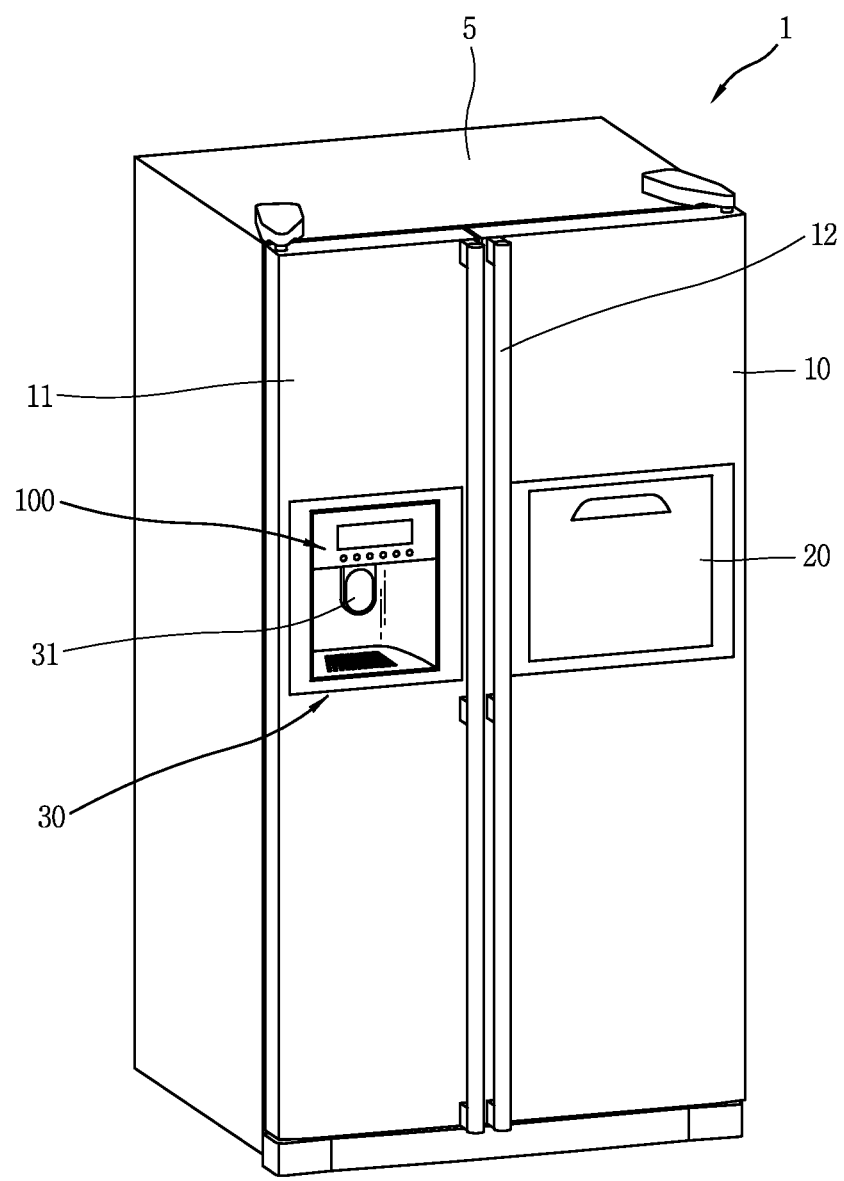
FIG. 1 is a perspective view illustrating a refrigerator according to exemplary embodiments of the present disclosure.

FIG. 1 is a perspective view illustrating a refrigerator according to exemplary embodiments of the present disclosure.

Referring to FIG. 1, a refrigerator 1 according to exemplary embodiments of the present disclosure includes a main body 5 including a storage chamber (not shown) and doors 10 and 11 opening and closing the storage chamber. The doors 10 and 11 are hinge-coupled and installed to be rotatable to both sides of the main body 5. Handles 12 are disposed on the doors 10 and 11, respectively.

The storage chamber may be divided into a freezer compartment and a refrigerator compartment which may be individually opened and closed by the freezing and refrigerating doors 11 and 10, respectively.

In exemplary embodiments, the left door of FIG. 1 may be a freezing door and the right door may be a refrigerating door. In this case, however, the left door may also be a refrigerating door and the right door may also be a freezing door.

A home bar 20 is installed on the refrigerating door 10. The home bar 20 may be opened and closed by a home bar door. Drinking beverage or cosmetics may be kept in storage at low temperatures inside the home bar 20.

A dispenser 30 is installed on the freezing door 11. A water tank (not shown) and/or an ice making device (not shown) may be connected to the dispenser 30. A water supply device (not shown) may be connected to the water tank and the ice making device to supply water thereto from the outside.

An operating lever 31 is installed in the dispenser. When a user presses the operating lever 31, water or ice may be dispensed. Of course, the dispenser (not shown) may be configured to automatically dispense water or ice when a button (not shown) is pressed.

A display device 100 is disposed at an upper portion of the dispenser 30. The display device 100 may be detachably installed at the upper portion of the dispenser 30. The display device 100 may display a storage state and various functions of the refrigerator. Also, the display device 100 may be separated from the refrigerator and installed in a vehicle so as to be used as a DMB.

Figure 2:
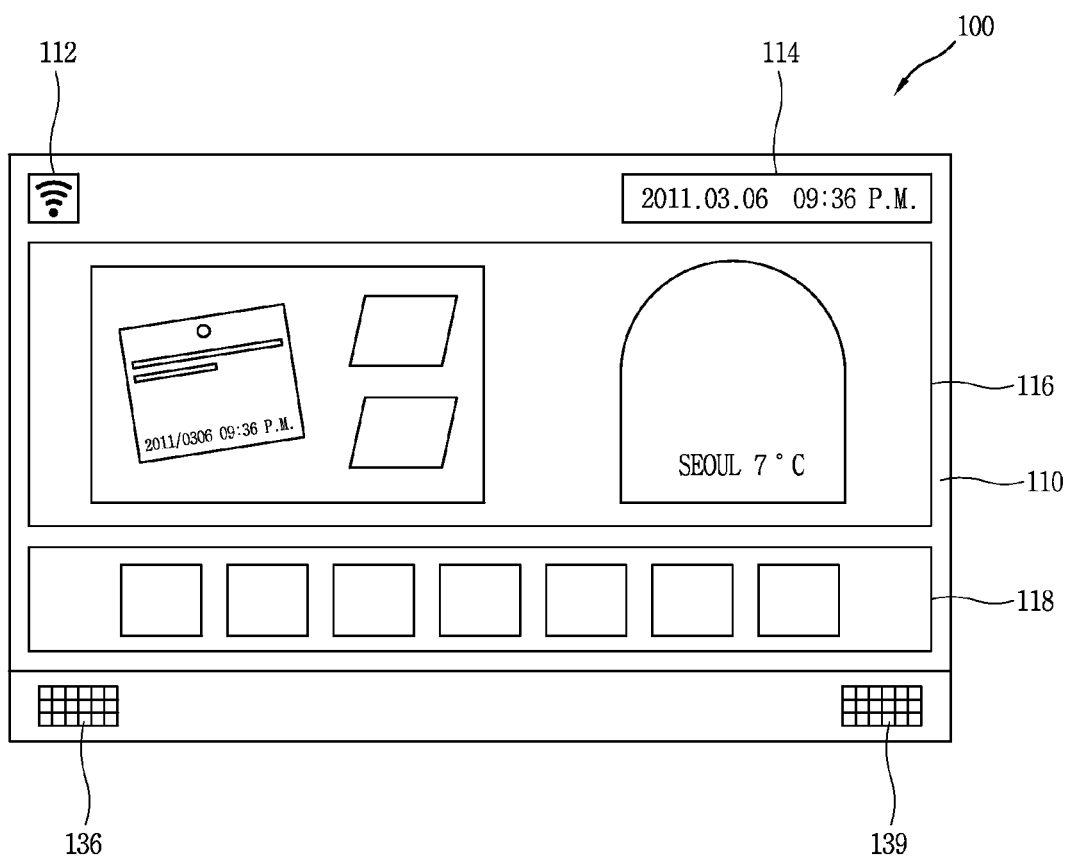
FIG. 2 is a front view of a display device of a refrigerator.

FIG. 2 is a front view of the display device 100 of the refrigerator.

Referring to FIG. 2, the display device 100 includes a display unit 110 and a speech input unit 136. As the display unit 110, a liquid crystal display (LCD) or a plasma display panel (PDP) may be employed.

The display unit 110 displays a screen image. The screen image includes a Wi-Fi receive strength indication region 112 indicating Wi-Fi receive strength, a date/time indication region 114 indicating a date/time, a Widget indication region 116 indicating a Widget such as memo, weather, or the like, and a function icon menu region 118 including a plurality of function icon menus.

Function icon menus included in the function icon menu region 118 may include an environment setting, a food item management, a message, a shopping list, a refrigerator management, a schedule, memo, and the like.

The speech input unit 136 is disposed in a portion of the display unit 110 to receive a user speech. As the speech input unit 136, a microphone may be employed.

A speech output unit 139 may be disposed in a portion of the display unit 110 to output a speech regarding a previously stored food item storage position or/and a storage term, or the like. As the speech output unit 139, a speaker may be employed.

In an exemplary embodiment, the function icon menu region 118 may include speech recognition menu (not shown). When the speech recognition menu is selected, an interface allowing the user to input a speech command is provided. The refrigerator 1 converts the speech command of the user into a text command using a speech recognition technique, processes the converted text command to a natural language, and maps the speech command to any one of predefined functions. The refrigerator 1 performs a corresponding function, thus executing a command through speech recognition.

For example, when the user selects a speech recognition menu, the refrigerator 1 may output a message inducing a command to a speech such as "May I help you?", as a speech or an image. When the user selects the speech recognition menu, the refrigerator 1 may simply output a notification sound or output a notification sound and a message together. The user may input a required command in the form of natural language as speech. For example, when the user pronounces "What kind of soup is in?", the refrigerator 1 may analyze the command input as speech, search for "soup" among food items kept in a storage chamber, and provide search results to the user. For example, the refrigerator 1 may output search results such as "There is a bean sprout soup put in the morning at the bottom shelf" by a sound and/or image. Also, when there is a memo for the "bean sprout soup", the refrigerator 1 may output a message indicating the presence of the corresponding memo or may immediately output the corresponding memo by sound and/or image. When the user opens the refrigerator door, the refrigerator 1 may turn on a light emitting device disposed in the shelf where the "bean sprout soup".

Also, for example, when the user pronounces "How much beef is left?" in the form of natural language, the refrigerator 1 may analyze the command input as speech, search for "beef" among the food items kept in storage chamber, and provide the search results to the user. For example, the refrigerator 1 may output search results such as "500 g is left" by sound and/or image. Also, when the user pronounces "what kind of dishes can be prepared with beef?", the refrigerator 1 may search for dishes that may be prepared with beef from a database stored therein or a database stored in a server, and provide the search results to the user. For example, the refrigerator 1 may output search results such as "How about Lombardian type beef dish" by sound and/or image. In addition, in a case in which the user pronounces "How's taste postscripts to the dishes?", the refrigerator 1 may search for taste postscripts of the "Lombardian type beef dish" from the database stored therein or the database stored in a server, and provide the search results to the user. For example, the refrigerator 1 may output search results such as "High-end feeling", "Good for inviting guests", or the like, by sound and/or image.

Figure 3:
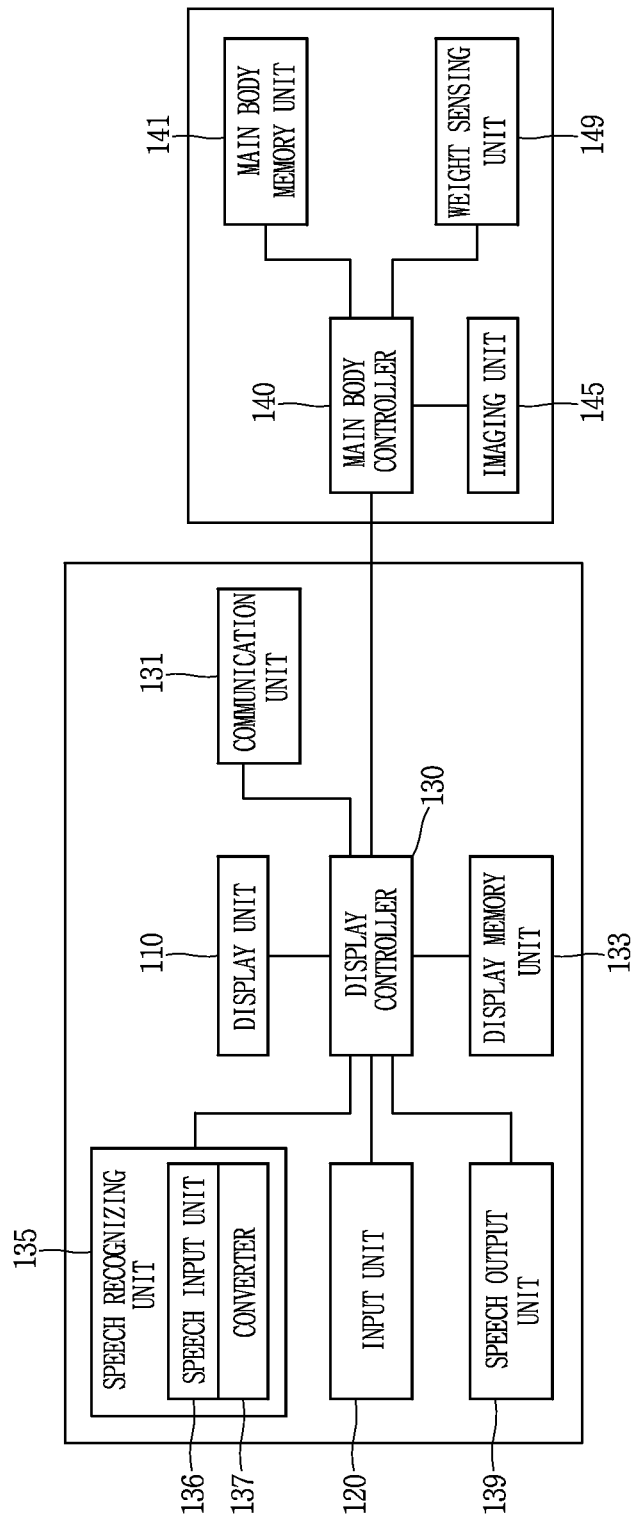
FIG. 3 is a block diagram illustrating a display controller and a main body controller.

FIG. 3 is a block diagram illustrating a display controller and a main body controller.

Referring to FIG. 3, a display controller 130 is connected to a display unit 10, a communication unit 131, an input unit 120, a display memory unit 133, a speech recognition unit 135, and a speech output unit 139. The display controller 130 controls operations of the display unit 110, the communication unit 131, the input unit 120, the display memory unit 133, the speech recognition unit 135, and the speech output unit 139.

The communication unit 131 may receive image data or DMB data from a broadcasting state or a base station and allows the display unit 110 and/or the speech output unit 139 to output the received image data or the DMB data. Also, the communication unit 131 is connected to a server or an external terminal through a network and transmits and receives data under the control of the display controller 130. For example, the communication unit 131 may receive a text query from the display controller 130 and transmits the received text query to a server or an external terminal, and the server or the external terminal transmits search requests with respect to the text query to the communication unit 131 through a search engine. The communication unit 131 delivers search results received from the server or the external terminal to the display controller 130, so that the search results may be output to the display unit 110 or/and the speech output unit 139.

The speech recognition unit 135 may include a speech input unit 136 allowing a user to input a speech and a converter 137 converting a speech input to the speech input unit 136 into a speech frequency. The converter 137 converts a speech frequency of the user into a digital signal and subsequently delivers the converted digital signal to the display controller 130. The display controller 130 stores the received digital signal to the display memory unit 133.

The display memory unit 133 stores speech information that is matched to names of food items stored in the refrigerator and that is to be output through the speech output unit 139 in advance. Speech information regarding names of food items may be stored in the display memory unit 133 in advance when the refrigerator is manufactured.

In an exemplary embodiment, a speech query received from the user is converted into a text query before being executed in a search engine. The speech query received through the speech input unit 136 may be recognized as text before being executed in at least one search engine including a text search engine set to process a text query.

The refrigerator 1 is set to receive a speech query through the speech input unit 136 and a text query through the input unit 120, and process the received speech and text queries, respectively. The speech input unit 136 is activated to receive a speech query, and the input unit 120 is activated to receive a text query. In this respect, however, a search engine executing a query may include a text search engine set to receive only a text query. Thus, the display controller 130 may include a query conversion unit (not shown) configured to receive a speech query and recognize the received speech query, as a text query.

The text query is delivered to a search engine, for follow-up processing. The search engine may be installed in the refrigerator 1 or may be installed in a server or an external terminal and accessed trough a network. In order to enhance reception and processing of a query, the display controller 130 performs additional processing. For example, the refrigerator 1 may be configured to receive a speech query, but some of terms of a speech query may be difficult to recognize due to variations of pronunciation. Thus, a speech query term database including a range of pronunciation of terms may associate variably pronounced query terms with general query terms representing related techniques.

The speech query term database may be used to associate a speech term of a speech query with an admitted text term of a text query to deliver the speech term to a text search engine. Thus, the query conversion unit may identify a speech query term of the speech query term database and convert the speech query term into an identified general text query term, thus converting a speech query into a text query. Alternatively, or additionally, a query may be processed by parsing the query according to a language model based on a domain of the query. For example, a language model may be devised to process a speech query according to a language that may be generally used while a user pronounces the speech query.

A main body controller 140 is connected to the display controller 130. A main body memory unit 141 may be connected to the main body controller 140. The main body memory unit 141 may store data regarding functions of the refrigerator in advance.

When the user selects a food management function icon, inputs a name of a food item through the speech recognition unit 135, selects a storage position through the input unit, and subsequently puts the food item to a corresponding storage chamber, the food item and the storage position thereof may be stored in the display memory unit 133. In this manner, the user may manually directly input a name and a storage position of a food item.

Or, a weight sensing unit 149 may be installed to sense a change in weight of a shelf when a food item is accommodated in a storage chamber (not shown) of the refrigerator or when a food item is taken out from a storage chamber (not shown). The weight sensing unit 149 is installed to sense a change in weight on a lower surface of each storage chamber. The weight sensing unit 149 may sense a change in weight when a food item is taken out or put into a predetermined storage chamber, and deliver the sensed change to the main body controller 140.

Or, an imaging unit 145 may be disposed in a storage chamber of the refrigerator in order to capture an image of a storage chamber and sense a change in feature information from the captured image when a food item is accommodated in a storage chamber (not shown) or when a food item is taken out from a storage chamber (not shown). The imaging unit 145 is installed to image an upper surface or a lateral surface of each storage chamber. The imaging unit 145 may sense a change in feature information in an image of a predetermined storage chamber when a food item is taken out from the storage chamber or when a food item is put in the storage chamber, and deliver the same to the main body controller 140.

Then, the main body controller 140 may sense which food item has been taken out from which storage chamber or which food item has been put into which storage chamber. The main body controller 140 delivers information regarding a name and a storage position of a food item put in a storage chamber to the display controller 130. Here, the display controller 130 may store the delivered information regarding a name and a storage position of a food item in the display memory unit 133. In this manner, a name and a storage position of a food item put into a storage chamber may be automatically input into the refrigerator 1 though the weight sensing unit 149 or the imaging unit 145.

A name and a storage position of a food item may be stored by selectively using any one of an automatic method and a manual method. Hereinafter, a method for storing a name and a storage position of a food item using the automatic method and the manual method will be described.

Figure 4:
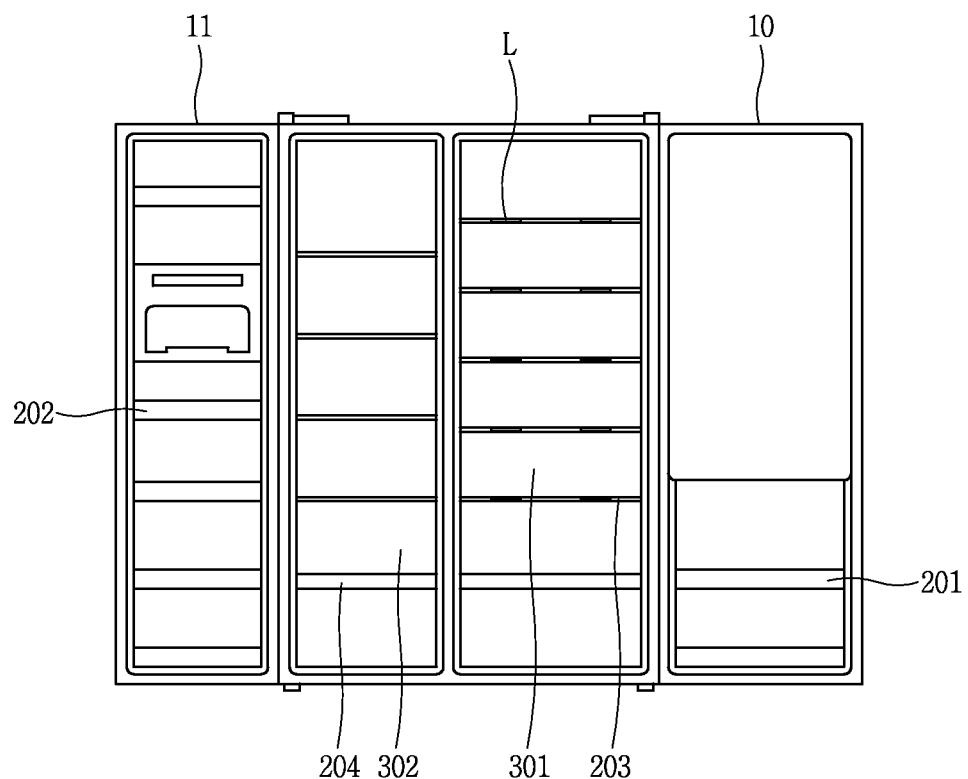
FIG. 4 is a front view illustrating an open state of a refrigerator door according to an exemplary embodiment of the present disclosure.

FIG. 4 is a front view illustrating a state in which the doors 10 and 11 of the refrigerator 1 are open according to an exemplary embodiment of the present disclosure.

Referring to FIG. 4, a plurality of door baskets 201 and 202 may be provided in rear surfaces of the doors 10 and 11 to receive storage items. The door baskets 201 and 202 and inner spaces of the freezing chamber and the refrigerating chamber may be divided into a plurality of spaces 301 and 302 by shelves or baskets 203 and 204, and a light emitting device L may be individually provided in each of the divided spaces 301 and 302.

Figure 5:
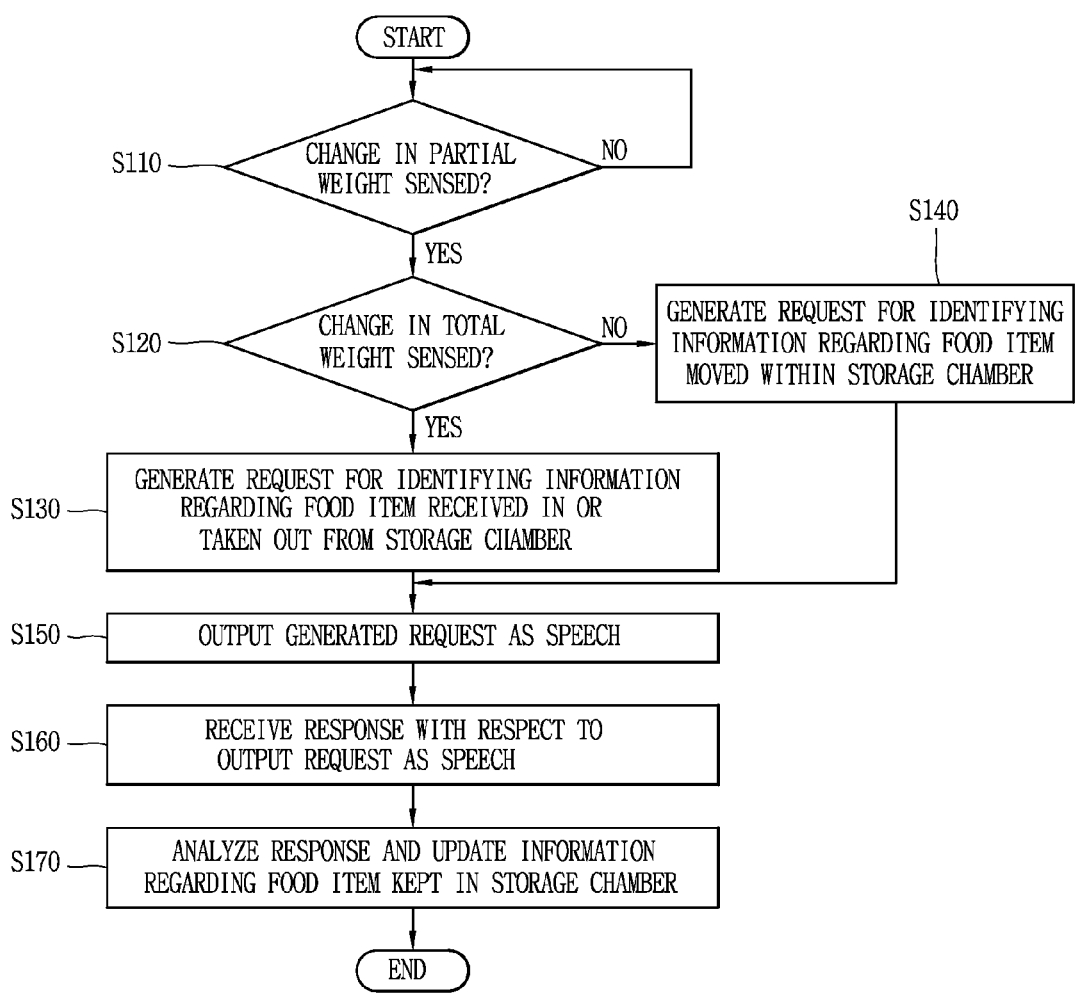
FIG. 5 is a flow chart illustrating a process of controlling an operation of a refrigerator according to a first exemplary embodiment of the present disclosure.

FIG. 5 is a flow chart illustrating a process of controlling an operation of a refrigerator according to a first exemplary embodiment of the present disclosure.

The refrigerator 1 determines whether a food item is received or taken out by sensing a weight of the food item. The weight sensing unit 149 may include a plurality of weight sensors that may sense a weight of a food item kept in a storage chamber. As the weight sensors, any one of a load cell, a touch sensor, and a vibration sensor may be used, for example.

First, the refrigerator 1 senses a change in a weight of each of the plurality of weight sensors. In other words, the refrigerator 1 may monitor whether a change in a weight of at least one of the plurality of weight sensors is sensed (step S110). When a change in a weight of at least one of the plurality of weight sensors is sensed, the refrigerator 1 monitors whether a change in the entirety of the plurality of weight sensors is sensed (step S120). When a change in a weight of at least one of the plurality of weight sensors is sensed, the refrigerator 1 may determine that a food item is received in a storage chamber or a food item has been taken out from a storage chamber. For example, when a weight of the entirety of the plurality of weight sensors has increased, the refrigerator 1 may determine that a new food item has been received in a storage chamber. When a weight of the entirety of the plurality of weight sensors has decreased, the refrigerator 1 may determine that a food item kept in a storage chamber has been taken out. However, when a change in a weight of the entirety of the plurality of weight sensors is not sensed, the refrigerator 1 may determine that a food item has not been received in a storage chamber or that a food item has not been taken out from a storage chamber. For example, the refrigerator 1 may determine that a food item has been moved within a storage chamber.

When it is determined that a food item has been received or taken out, the refrigerator 1 generates a request for identifying information regarding a food item which has been received or taken out (step S130). The request may be a request for checking a name of a food item which has been received in a storage chamber or a food item which has been taken out from a storage chamber. If it is determined that a new food item has been received in a storage chamber, the request may be a request for identifying a name of a received food item and a storage position of the received food item within a storage chamber. Also, the request may further include a request for identifying additional information such as an expiration date of the received food item, or the like. The additional information may be a predefined basic value if not separately input.

When it is determined that a food item has been moved within a storage chamber, the request may be a request for identifying a name of the food item and a position to which the food item has been moved within a storage chamber (step S140).

The refrigerator 1 may output the generated request as speech (step S150). For example, the refrigerator may convert the generated request in the form of text into a speech format using a text to speech (TTS) technique, and output the converted request in a speech format. In an exemplary embodiment, the refrigerator 1 may further include: an opening and closing sensing unit (not shown) that senses opening and closing of the door, and when it is sensed that the door is closed, the refrigerator 1 may output the generated request as speech. Since a food item cannot be received, taken out, or moved with the door closed, the refrigerator 1 determines that an operation has been completed, and thus, when it is sensed that the door has been closed, the refrigerator outputs the generated request as speech. The refrigerator 1 may receive a response with respect to the output request, as speech (step S160).

The refrigerator 1 may analyze the response and update information regarding food items kept in a storage chamber (step S170). For example, the refrigerator 1 may convert the input response in the form of speech into a text format using a speech to text (STT) technique. The refrigerator 1 may analyze the response converted into the text format and extract at least one of a name and a storage position of a food item. Using the at least one of the name and storage position of the food item, the refrigerator 1 may update information regarding food items kept in storage in the main body memory unit 141. For example, in a case in which a new food item is received, the refrigerator 1 may store a name and a storage position of the received food item. When a food item kept in storage is taken out, the refrigerator 1 may delete a name and a storage position of the food item. In a case in which a food item has been moved, the refrigerator 1 may change a storage position of the food item to the position to which the food item has been moved.

Figure 6:
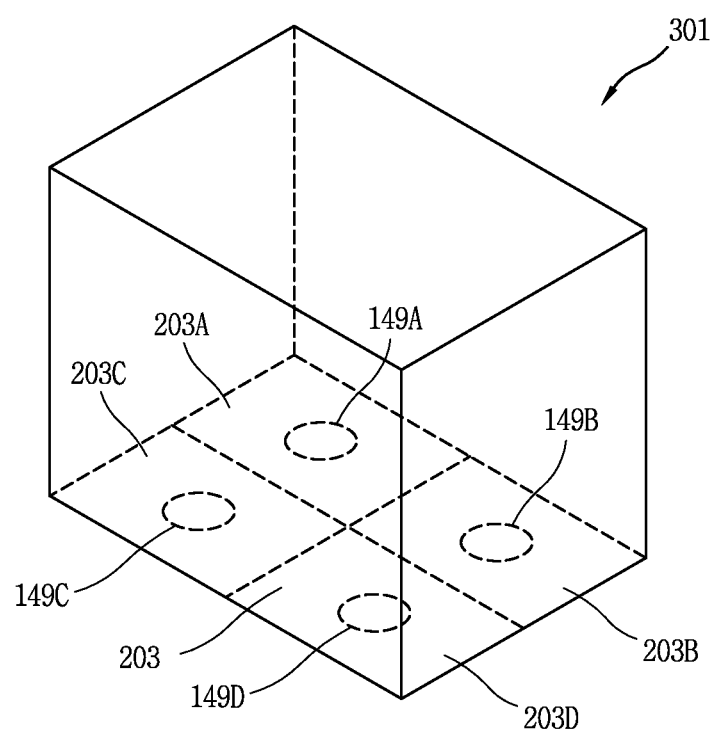
FIG. 6 is a view illustrating a layout of weight sensors according to the first exemplary embodiment of the present disclosure.

FIG. 6 is a view illustrating a layout of weight sensors according to the first exemplary embodiment of the present disclosure.

Each space (for example, a storage chamber) 301 may be divided into a plurality of regions 203A to 203D to receive food items classified by a user. In FIG. 6 and the following drawings, it is described that each space 301 is divided into four regions, but the number of divided regions of each space 301 is not limited thereto and each space 301 may be divided into regions less or more than four regions. Also, each space 301 may be divided into different numbers of regions.

Referring to FIG. 6, in order to measure a weight of a food item kept in storage, weight sensors 149A to 149D may be installed in each of the regions 203A to 203D. For example, weight sensors 149A to 149D may be installed in upper surfaces of shelves corresponding to the regions 203A to 203D, respectively, to measure a weight of a corresponding region.

Figure 7:
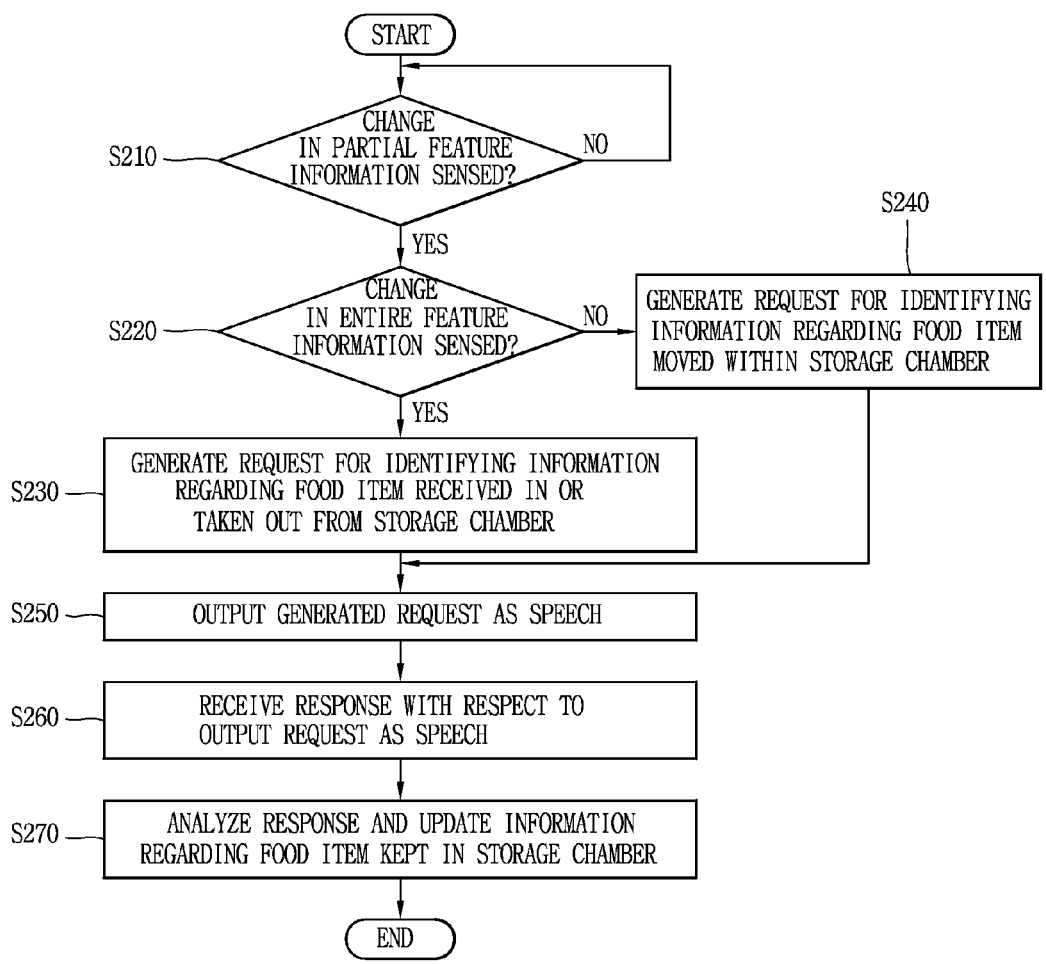
FIG. 7 is a flow chart illustrating a process of controlling an operation of a refrigerator according to a second exemplary embodiment of the present disclosure.

FIG. 7 is a flow chart illustrating a process of controlling an operation of a refrigerator according to a second exemplary embodiment of the present disclosure.

The refrigerator 1 obtains a captured image of a storage chamber, detects features information from the captured image, and determines whether a food item has been received or taken out based on the extracted feature information. In order to detect the feature information from the captured image, the refrigerator 1 may cancel noise, or the like, irrespective of a food item through edge extraction or pattern extraction.

First, the refrigerator 1 detects a change in feature information of an image of a partial region of a storage chamber (step S210). In other words, the refrigerator 1 may divide the image obtained by imaging a storage chamber into a plurality of regions, and monitor whether a change in feature information of the captured image has been detected in at least one of the plurality of regions. When a change in feature information of the captured image is detected in at least one of the plurality of regions, the refrigerator 1 monitors whether a change in feature information of the captured image is detected in the entirety of the plurality of regions (step S220). When a change in feature information of the captured image is detected in the entirety of the plurality of regions, the refrigerator 1 may determine that a food item has been received in a storage chamber of a food item has been taken out from a storage chamber. For example, when new feature information has been added in the captured image in the entirety of the plurality of regions, the refrigerator 1 may determine that a new food item has been received in a storage chamber. When existing feature information of the captured image has been deleted in the entirety of the plurality of regions, the refrigerator 1 may determine that a food item kept in a storage chamber has been taken out from a storage chamber. However, when a change in the feature information of the captured image is not sensed in the entirety of the plurality of regions, the refrigerator 1 may determine that a food item has not been received in a storage chamber of a food item has not been taken out from a storage chamber. For example, the refrigerator 1 may determine that a food item has been moved within a storage chamber.

In an exemplary embodiment, in a case in which a new food item is received in a storage chamber, an existing food item has been taken out from a storage chamber, or a food item has been moved within a storage chamber, the refrigerator 1 may calculate a volume of each region of the captured image and guide the user to arrange or relocate a food item. For example, in a case in which there is no space sufficient for accommodating a new food item in a particular storage chamber, the refrigerator 1 may analyze the captured image and propose the user to move a corresponding food item to a different storage chamber. In this case, the refrigerator 1 may output information regarding a storage chamber which has an extra space, as speech and/or image.

In the above, it has been described that the refrigerator 1 obtains a captured image of a storage chamber through a single imaging unit 145, but it may also be implemented such that a plurality of imaging units 145 may obtain captured images of a storage chamber. In this case, a single imaging unit 145 may image one of divided regions of a storage chamber. Also, steps S230 to S270 are the same as those of steps S130 to S170 illustrated in FIG. 5, so detailed description thereof will be omitted.

Figure 8:
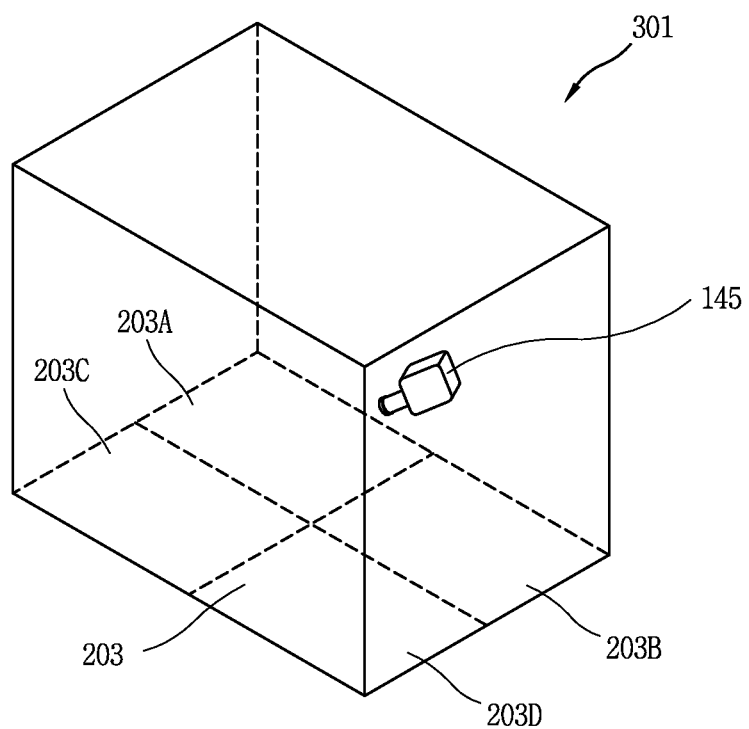
FIG. 8 is a view illustrating a disposition of an imaging unit according to the second exemplary embodiment of the present disclosure.

FIG. 8 is a view illustrating a disposition of the imaging unit 145 according to the second exemplary embodiment of the present disclosure.

As described above, each space (for example, a stage chamber) 301 may be divided into a plurality of regions 203A to 203D for receiving food items classified by the user. Referring to FIG. 8, the imaging unit 145 may be installed in each space 301 to image a food item kept therein. For example, the imaging unit 145 may be installed on an upper surface or a lateral surface of each space 301 to image an upper surface of a shelf or a basket 203 or 204.

FIGS. 9A through 11C are views illustrating a process of controlling an operation of the refrigerator 1 according to first and second exemplary embodiments of the present disclosure.

Figure 9A:
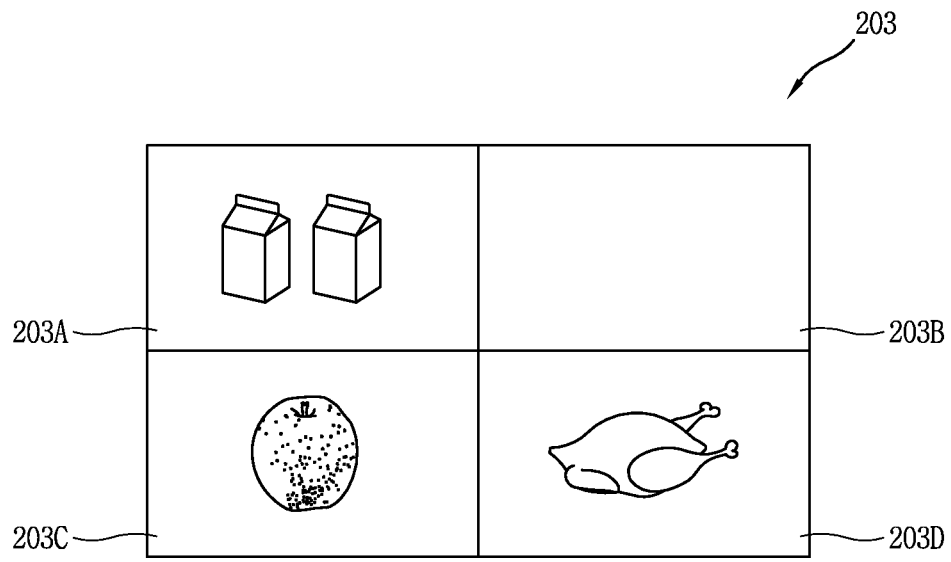
FIGS. 9A through 11C are views illustrating a process of controlling an operation of a refrigerator according to first and second exemplary embodiments of the present disclosure.
Figure 9B:
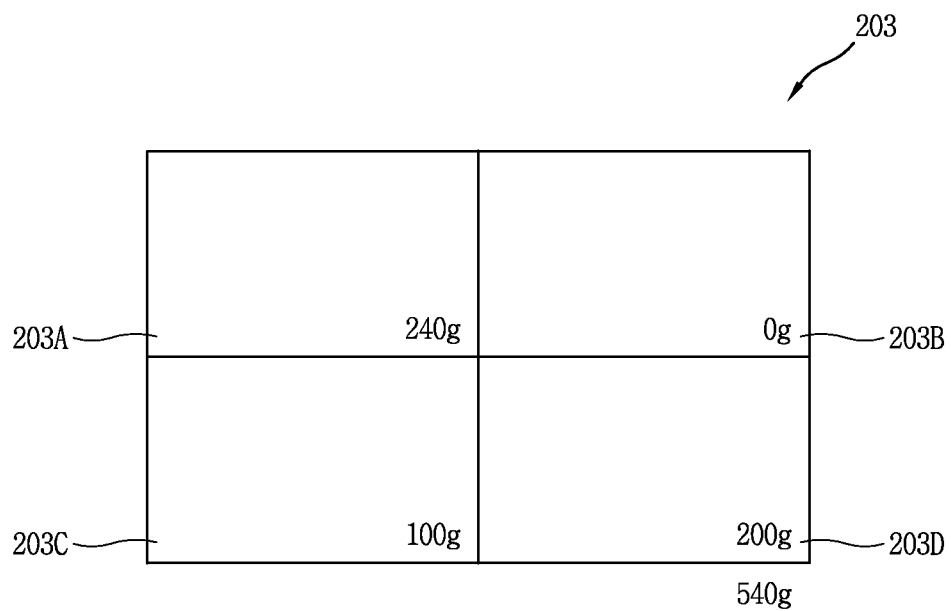
Figure 9C:
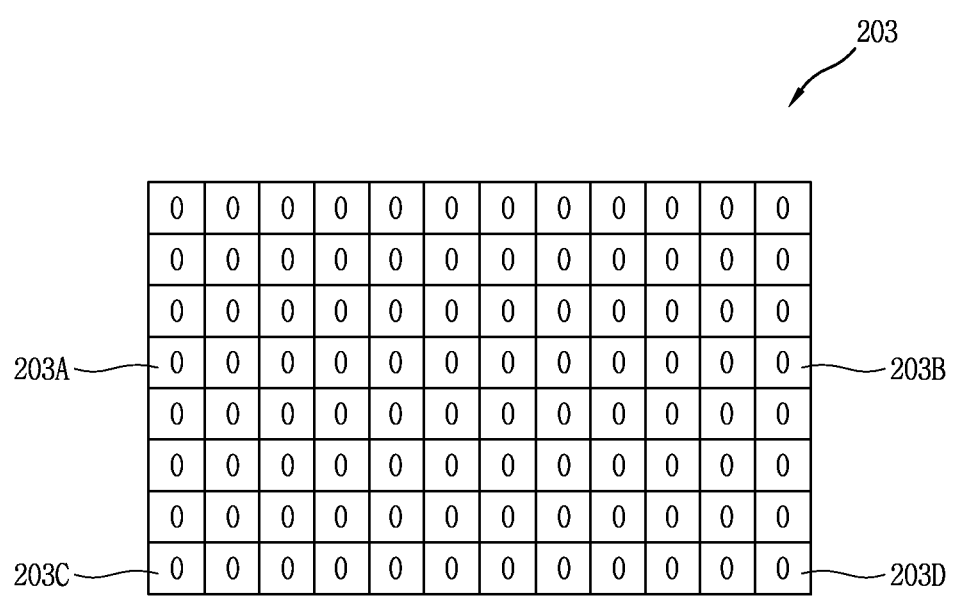

FIGS. 9A through 9C are views illustrating storage state of storage chambers of the refrigerator 1 according to first and second exemplary embodiments of the present disclosure.

Referring to FIG. 9A, a storage chamber 203 of the refrigerator 1 may be divided into a plurality of regions 203A through 203D for receiving food items classified by the user. Among four regions 203A through 203D of the refrigerator 1, food items are kept in storage in the first region 203A, the third region 203C, and the fourth region 203D, respectively. The refrigerator 1 may store information regarding the food items kept in storage, respectively, in the regions according to a manual or automatic method as described above before or after the food items are respectively received in the regions.

Referring to FIG. 9B, the refrigerator 1 may sense a weight of a food item kept in storage in each of the regions (one of regions 203A to 203D) through each of the weight sensors. Also, the refrigerator 1 may sense a weight of the food items stored in the entirety regions 203A to 203D through each of the weight sensors. The refrigerator 1 may store a weight of a food item kept in storage in each of the regions 203A to 203D and a weight of the food items kept in storage in the entire regions 203A to 203D.

Referring to FIG. 9C, the imaging unit 145 periodically captures images of storage chambers and stores the captured images in the main body memory unit 141. The main body memory unit 141 stores a current image which has been captured at a current point in time and a previous image captured at a previous point in time immediately before the current image is captured. Namely, the current image is the latest image of a storage chamber. The main body controller 140 calculates a difference between feature information of a current image and feature information of a previous image by region and extracts mask information corresponding to the difference in feature information between the two images. In the mask information illustrated in FIG. 9C, 0 represents a block in which there is no difference between a previous image and a current image. Although not shown in FIG. 9C, 1 represents a block in which there is a difference between a previous image and a current image. In an exemplary embodiment, the mask information may be set to +1 when an object is detected from a current image and may be set to −1 when an object is not detected from a current image.

Figure 10A:
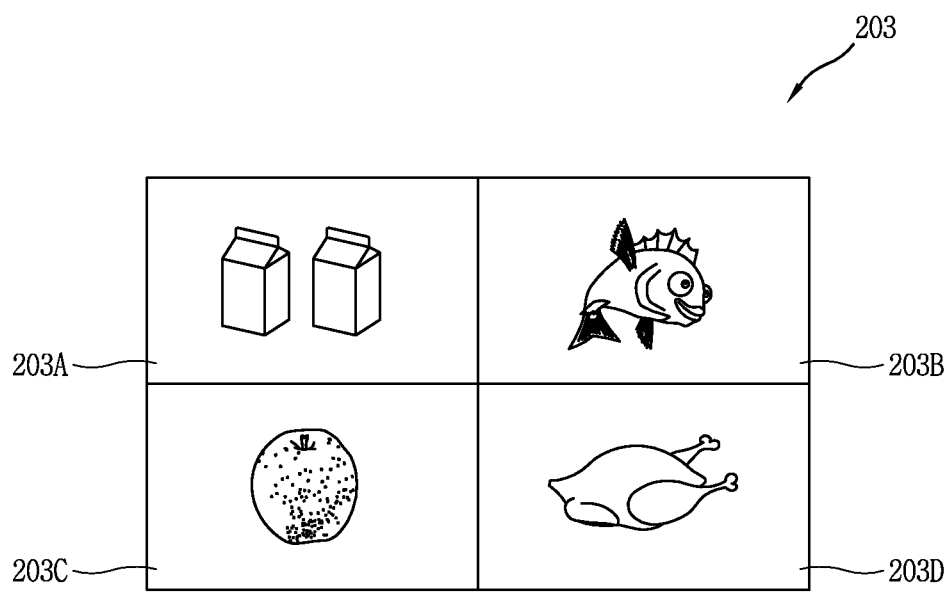
Figure 10B:
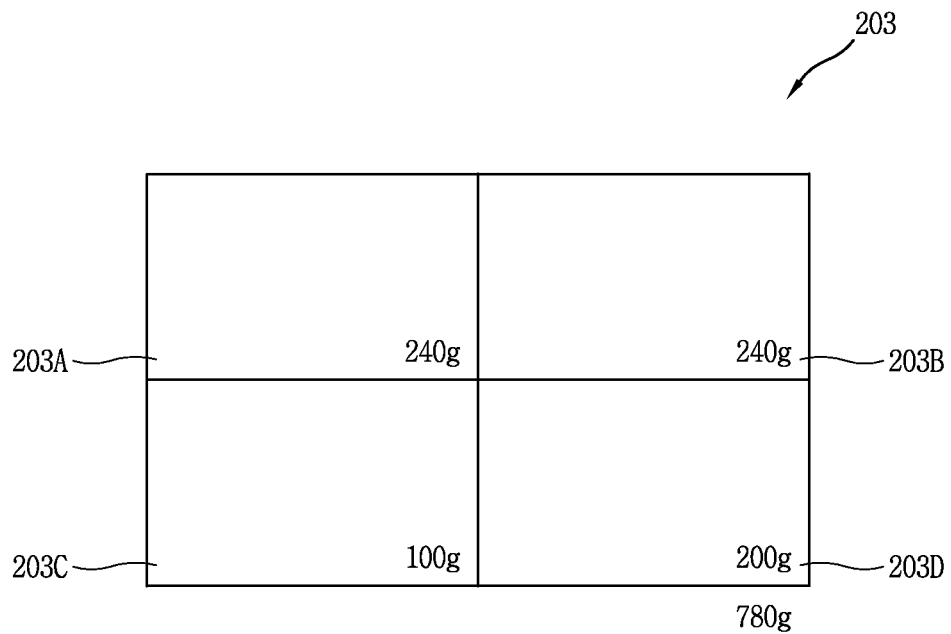
Figure 10C:
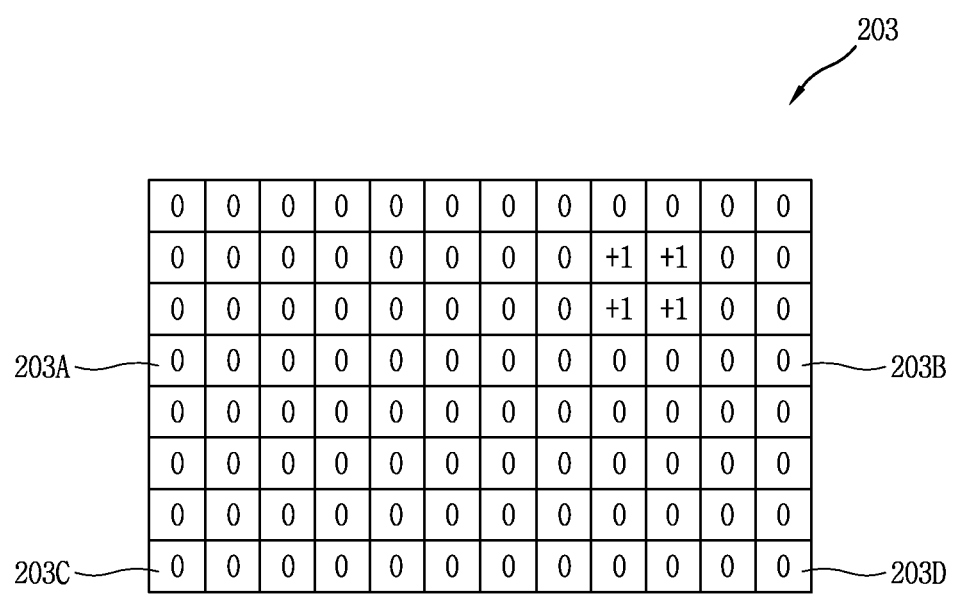

FIGS. 10A through 10C are conceptual views illustrating a process of receiving a new image in a storage chamber of the refrigerator according to first and second exemplary embodiments of the present disclosure.

FIGS. 10A through 10C illustrate a situation in which a new food item is received in a second region 203B, among four regions 203A to 203D of the refrigerator 1 as illustrated in FIG. 10A.

Referring to FIG. 10B, in a case in which a new food item is received in the second region 203B, a weight sensor disposed in the second region 203B may sense a change in a weight of a food item. The refrigerator 1 measures a weight corresponding to the entire regions 203A to 203D and determines whether the weight corresponding to the entire regions 203A to 203D has been changed. Since the weight corresponding to the entire regions 203A to 203D has been increased from '540 g' to '780 g' according to the determination results, the refrigerator 1 may determine that a new food item has been received in the storage chamber. Thus, the refrigerator 1 may generate a request for identifying information regarding the received food item, and output the generated request as speech.

Referring to FIG. 10C, in the case in which a new food item is received in the second region 203B, the imaging unit 145 may detect a change feature information in the second region 203B. In other words, since there is a difference between a previous image and a current image in mask information, the refrigerator 1 may determine that a change in feature information in the second region 203B has been detected. Also, since there is a difference between the previous image and the current image in the mask information of the entire regions 203A to 203D (namely, there is a difference between the previous image and the current image when viewed on the whole), the refrigerator 1 may determine that a change in the feature information in the entire regions 203A to 203D has been detected. In particular, since mask information is set to +1 in the portion in which a changed has been detected, the refrigerator 1 may determine that a food item has been received, generate a request for identifying information regarding the received food item, and output the request as speech.

For example, the request may be a query such as "what did you add?", "What's the food item added to the interior of the right side?", "Is it fish that added to the interior of the right side?", or the like.

Figure 11A:
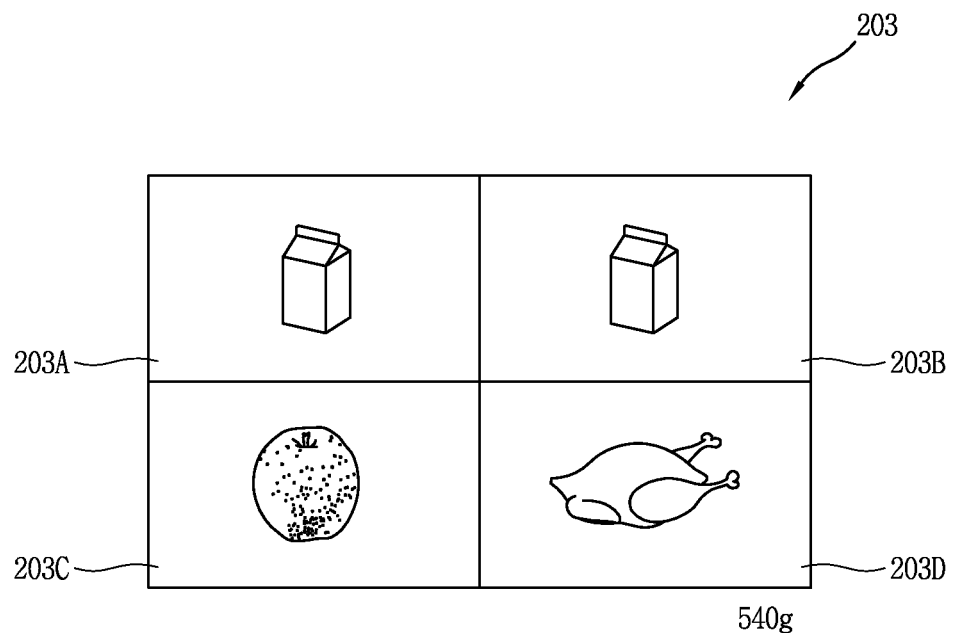
Figure 11B:
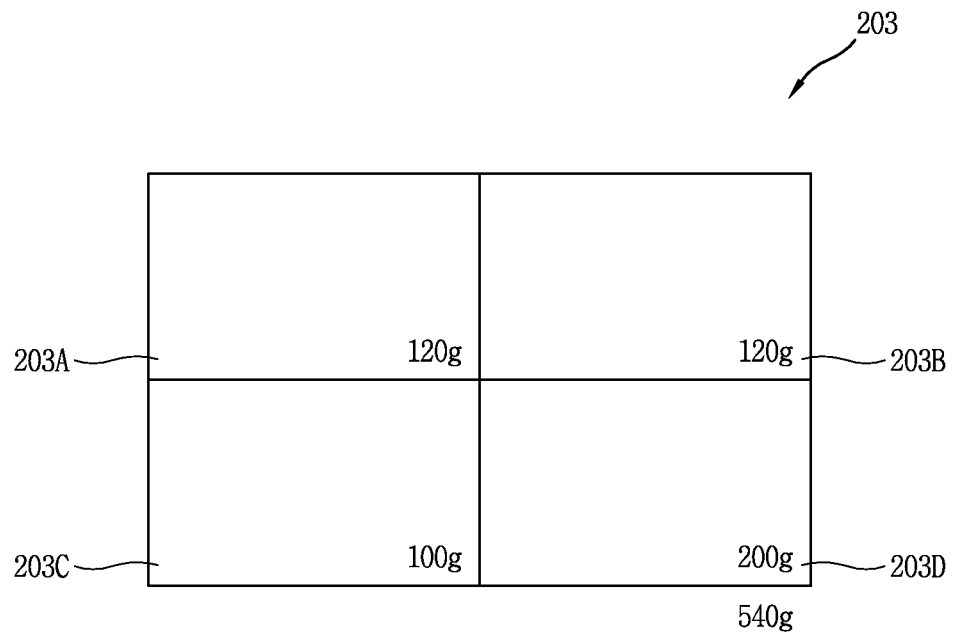

FIGS. 11A through 11C are conceptual views illustrating a process of moving a food item within a storage chamber of the refrigerator 1 according to the first and second exemplary embodiments of the present disclosure.

FIGS. 11A through 11C illustrate a situation in which a food item kept in storage in the first region 203B, among the four regions 203A to 203D of the refrigerator 1, is moved the second region 203B as illustrated in FIG. 11A.

Referring to FIG. 11B, in a case in which a food item kept in storage in the first region 203B is moved to the second region 203B, the weight sensors respectively disposed in the first region 203A and the second region 203B may sense a change in the weight of food item. The refrigerator 1 measures a weight corresponding to the entire regions 203A to 203D and determines whether there is a change in the weight of the entire regions 203A to 203D. Since there is no change in the weight corresponding to the entire regions 203A to 203D according to the determination results, the refrigerator may determine that a food item has been moved within a storage chamber. Thus, the refrigerator 1 may generate a request for identifying information regarding the moved food item and output the request as speech.

Referring to FIG. 11C, in a case in which a food item kept in storage in the second region 203B is moved to the second region 203B, the imaging unit 145 may detect a change in feature information in the first region 203A and the second region 203B. In other words, since there is a difference between a previous image and a current image in mask information of the first region 203A and the second region 203B, the refrigerator 1 may determine that a change in feature information in the first region 203A and the second region 203B has been detected. Also, the refrigerator 1 determines whether there is a difference between the previous image and the current image in the mask information of the entire regions 203A to 203D (namely, the refrigerator 1 determines whether there is a difference between the previous image and the current image when viewed on the whole). Since the mask information of the first region 203A and the mask information of the second region 203B are detected as values that may be canceled out, the refrigerator 1 may determine that a change feature information in the entire regions 203A to 203D has not been detected. In particular, while mask information in a portion in which a change is detected in the first region 203A is set to −1, mask information in a portion in which a change is detected in the second region 203B is set to +1, the refrigerator 1 may determine that a food item has been moved from the first region 203A and received in the second region 203B, generates a request for identifying information regarding the received food item, and output the request as speech.

For example, the request may be a query such as "What did you move?", "What is the food item moved to the interior of the right side?", "Is it milk moved to the interior of the right side?", or the like.

FIGS. 12 through 15 are views illustrating a user interface provided by the refrigerator 1 according to exemplary embodiments of the present disclosure.

Figure 12:
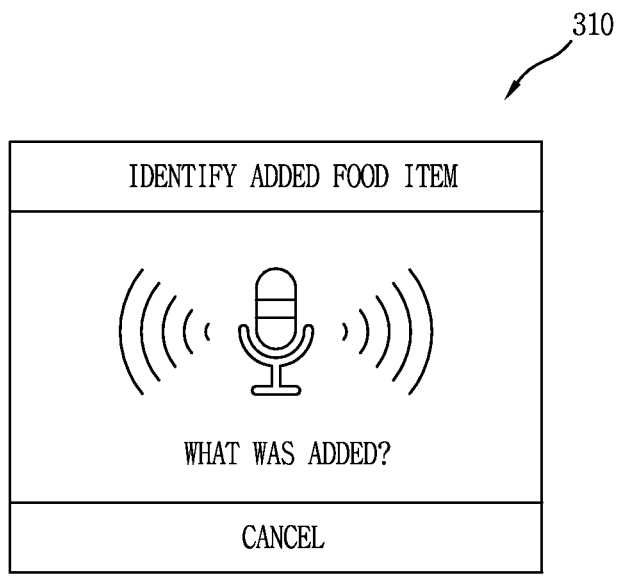
FIGS. 12 through 15 are views illustrating a user interface provided by the refrigerator according to exemplary embodiments of the present disclosure.
Figure 12:

In FIG. 12, when it is determined that a new food item is received in a storage chamber, using the weight sensing unit 149 or the imaging unit 145 as described above and when a name of the received food item is not identified, the refrigerator 1 may generate a request for identifying a name of the accommodated food item. For example, the refrigerator 1 may generate a query such as "What was added?". The refrigerator 1 may output the generated query as speech. In addition, the display device 100 may display the generated query on a screen 310 through the display unit 110.

When the speech output is finished or while the speech is being output, the refrigerator 1 may monitor whether the user responds to the request. In a case in which the user responds to the request, the refrigerator 1 may analyze the response to identify information regarding the accommodated food item and store the identified information. For example, the user may responds as "Apple", and the refrigerator 1 may store that "Apple" has been newly kept in a storage chamber, as data.

Figure 13:
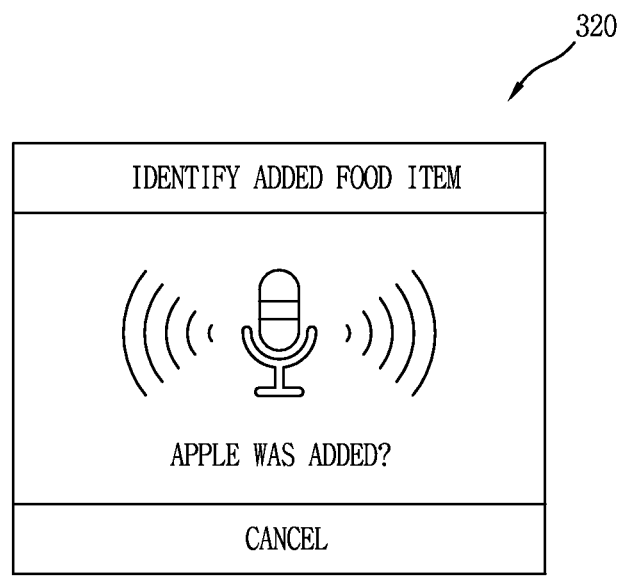
Figure 13:

In FIG. 13, when it is determined that a new food item has been accommodated in a storage chamber using the weight sensing unit 149 or the imaging unit 145 as described above and when a name of the accommodated food item is not accurately identified, the refrigerator 1 may generate a request for accurately identifying a name of the accommodated food item. For example, the refrigerator 1 may generate a query such as "Apple was added?. The refrigerator 1 may output the generated query as speech. In addition, the display device 100 may display the generated query on the screen 320 through the display unit 110.

When the speech output is finished or while the speech is being output, the refrigerator 1 may monitor whether the user responds to the request. In a case in which the user responds to the request, the refrigerator 1 may analyze the response to identify information regarding the accommodated food item and store the identified information. For example, the user may responds as "Yes", and the refrigerator 1 may store that "Apple" has been newly kept in a storage chamber, as data.

However, in a case in which the user responds as "No", the refrigerator 1 may identify a newly storage food item through speech and image interfaces provided in FIG. 12.

Figure 14:
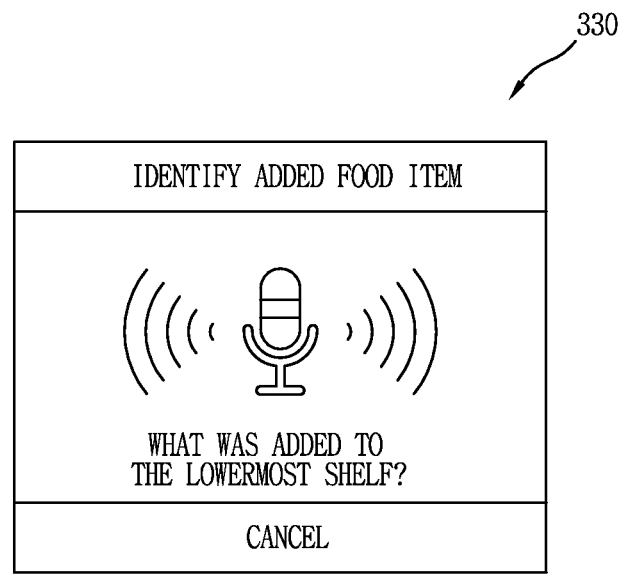
Figure 14:
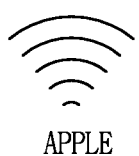

In FIG. 14, when it is determined that a new food item has been accommodated in a storage chamber using the weight sensing unit 149 or the imaging unit 145 as described above and when a name of the accommodated food item is not accurately identified, the refrigerator 1 may generate a request for accurately identifying a name of the accommodated food item. For example, the refrigerator 1 may generate a query such as "Apple was added to the lowermost shelf?", or the like. The refrigerator 1 may output the generated query as speech. In addition, the display device 100 may display the generated query on a screen 330 through the display unit 110.

When the speech output is finished or while the speech is being output, the refrigerator 1 may monitor whether the user responds to the request. In a case in which the user responds to the request, the refrigerator 1 may analyze the response to identify information regarding the accommodated food item and store the identified information. For example, the user may responds as "Apple", and the refrigerator 1 may store that "Apple" has been newly kept in the lowermost shelf of a storage chamber, as data.

FIGS. 12 through 14 illustrate user interfaces provided in the refrigerator 1 when a new food item is received in a storage chamber, but an interface identical or similar thereto may also be applied to a case in which a food item is moved or taken out.

Figure 15:
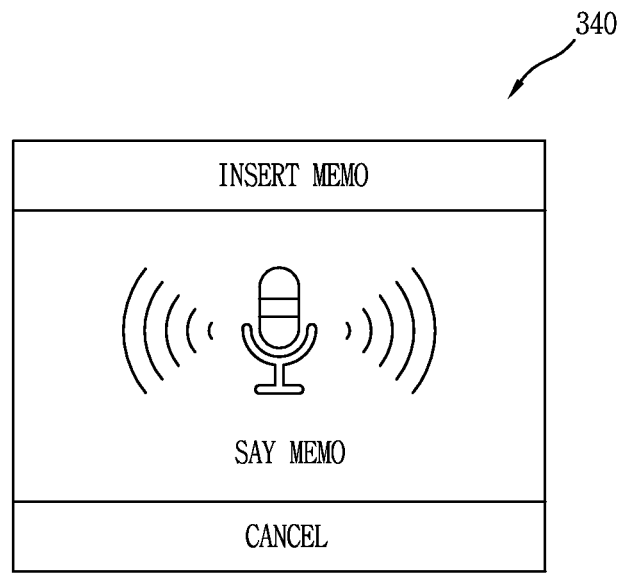

In FIG. 15, when a new food item is received, the refrigerator 1 may provide an interface for leaving a note regarding the received food item. For example, when information regarding a food item kept in a storage chamber is identified through any one of the interfaces illustrated in FIGS. 12 through 14, the refrigerator 1 may additionally generate a request for inputting a memo (or a note) with respect to a newly stored food item. For example, the refrigerator 1 may generate a query such as "Say memo". The refrigerator 1 may output the generated query as speech. In addition, the display device 100 may display the generated query on a screen 340 through the display unit 110.

When the speech output is finished or while the speech is being output, the refrigerator 1 may monitor whether the user responds to the request. In a case in which the user responds to the request, the refrigerator 1 may analyze the response to identify the memo regarding the accommodated food item and store the identified memo. Thereafter, when the user searches for the corresponding food item or takes the corresponding food item out from a storage chamber, if the previously stored memo is present, the corresponding memo may be output as speech and/or image.

The exemplary embodiments described above are to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A refrigerator comprising:
 a storage chamber shaped to store food items;
 a memory configured to store information regarding food items presently kept in the storage chamber;
 a weight sensing unit coupled to the storage chamber and configured to sense weight of the food items presently kept in the storage chamber;
 a speech output unit;
 a speech input unit; and
 a controller configured to:
  generate a query directed to a user of the refrigerator for identifying information regarding either a food item which has been received at the storage chamber when the weight sensing unit indicates that a food item has been placed in the storage chamber, or regarding a food item which has been removed from the storage chamber when the weight sensing unit indicates that a food has been removed from the storage chamber;
  cause the speech output unit to output the query as speech;
  receive a response, via the speech input unit, with respect to the query; and
  update the information regarding food items presently kept in the storage chamber based on the response.

2. The refrigerator of claim 1, wherein the weight sensing unit includes a plurality of weight sensors, and the weight sensing unit determines whether the food item has been received or removed by sensing a change in weight of each of the plurality of weight sensors and a change in weight of the entirety of the plurality of sensors.

3. The refrigerator of claim 2, wherein when the change in weight of said each of the plurality of weight sensors is sensed and the change in weight of the entirety of the plurality of weight sensors is sensed, the weight sensing unit determines that the food item has been received or removed.

4. The refrigerator of claim 2, wherein when the change in weight of said each of the plurality of weight sensors is sensed but the change in weight of the entirety of the plurality of weight sensors is not sensed, the weight sensing unit determines that the food item has been moved within the storage chamber.

5. The refrigerator of claim 4, wherein when it is determined that the food item has been moved within the storage chamber, the controller is further configured to generate a query for identifying information regarding the moved food item.

6. The refrigerator of claim 1, wherein the information regarding the food items presently kept in the storage chamber includes a name of each of the food items presently kept in the storage chamber and a storage position of each of the food items presently kept in the storage chamber.

7. The refrigerator of claim 1, further comprising:
 an opening and closing sensing unit configured to sense opening and closing of a door of the refrigerator,
 wherein the controller is further configured to cause the speech output unit to output the generated query as speech when the door is sensed to be closed.

8. The refrigerator of claim 1, wherein the weight sensing unit includes any one of a load cell, a touch sensor, or a vibration sensor.

9. A method for controlling an operation of a refrigerator, the method comprising:
 storing, in a memory, information regarding food items presently kept in a storage chamber of the refrigerator;
 sensing, by a weight sensor of the refrigerator coupled to the storage chamber, weight of the food items presently kept in the storage chamber;
 generating, by a controller of the refrigerator, a query directed to a user of the refrigerator for identifying information regarding either a food item which has been received at the storage chamber when the weight sensor indicates that a food item has been placed in the storage chamber, or regarding a food item which has been removed from the storage chamber when the weight sensor indicates that a food has been removed from the storage chamber;

outputting, via a speech output unit of the refrigerator, the generated query as speech;

receiving, via a speech input unit of the refrigerator, a response with respect to the query; and updating the information regarding food items presently kept in the storage chamber based on the response.

\* \* \* \* \*